(12) United States Patent
De La Cruz Vazquez et al.

(10) Patent No.: US 11,350,066 B1
(45) Date of Patent: May 31, 2022

(54) CAMERA-ASSISTED PROJECTION OPTICS DISTORTION CHARACTERIZATION AND CORRECTION

(71) Applicant: TEXAS INSTRUMENTS INCORPORATED, Dallas, TX (US)

(72) Inventors: Jaime Rene De La Cruz Vazquez, Carrollton, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/118,327

(22) Filed: Dec. 10, 2020

(51) Int. Cl.
  *H04N 3/23* (2006.01)
  *H04N 9/31* (2006.01)
  *G06T 3/00* (2006.01)
  *G06T 5/00* (2006.01)

(52) U.S. Cl.
  CPC ......... *H04N 9/3185* (2013.01); *G06T 3/0093* (2013.01); *G06T 5/006* (2013.01); *H04N 9/3141* (2013.01); *G06T 2207/10028* (2013.01)

(58) Field of Classification Search
  CPC ................ H04N 9/3185; H04N 9/3141; G06T 3/0093; G06T 5/006; G06T 2207/10028
  USPC ......................................... 348/746, 744, 745
  See application file for complete search history.

(56) References Cited

U.S. PATENT DOCUMENTS

| | | | | |
|---|---|---|---|---|
| 7,262,816 | B2* | 8/2007 | McDowall | G03B 21/10 348/744 |
| 8,406,562 | B2* | 3/2013 | Bassi | H04N 9/3194 382/275 |
| 8,913,162 | B2* | 12/2014 | Kawabe | H04N 5/217 348/241 |
| 9,762,871 | B2 | 9/2017 | De La Cruz et al. | |
| 9,769,443 | B2 | 9/2017 | De La Cruz et al. | |
| 10,681,318 | B2 | 6/2020 | De La Cruz et al. | |
| 10,684,537 | B2 | 6/2020 | De La Cruz et al. | |

* cited by examiner

*Primary Examiner* — Trang U Tran
(74) *Attorney, Agent, or Firm* — Michelle F. Murray; Charles A. Brill; Frank D. Cimino

(57) ABSTRACT

A method includes projecting an image onto a projection surface through a projection lens of a projector, where the image comprises a fiducial marker. The method also includes capturing a point cloud of the fiducial marker with a camera, and generating a distortion map of projection lens distortion based at least in part on the point cloud. The method also includes generating a correction map for the projection lens, and applying the correction map to a video signal input to the projector.

20 Claims, 12 Drawing Sheets

CAMERA-ASSISTED PROJECTION OPTICS DISTORTION CHARACTERIZATION AND CORRECTION

SUMMARY

In accordance with at least one example of the description, a method includes projecting an image onto a projection surface through a projection lens of a projector, where the image comprises a fiducial marker. The method also includes capturing a point cloud of the fiducial marker with a camera, and generating a distortion map of projection lens distortion based at least in part on the point cloud. The method also includes generating a correction map for the projection lens, and applying the correction map to a video signal input to the projector.

In accordance with at least one example of the description, a controller is configured to obtain a point cloud of a fiducial marker. The controller is also configured to generate a distortion map of distortion caused by projection optics in a projection system based at least in part on the point cloud. The controller is configured to generate a correction map for the projection optics, and generate a transient warping map for the projection system. The controller is configured to convolve the correction map with the transient warping map to create a convolution correction map. The controller is also configured to apply the convolution correction map to a signal for display by the projection optics.

In accordance with at least one example of the description, a controller is configured to obtain a point cloud of a fiducial marker. The controller is also configured to generate a distortion map of distortion caused by projection optics based at least in part on the point cloud. The controller is configured to generate a correction map for the projection optics, and apply the correction map to a video signal input to the projection optics.

BRIEF DESCRIPTION OF THE DRAWINGS

For a detailed description of various examples, reference will now be made to the accompanying drawings in which.

DETAILED DESCRIPTION

In projection optics, geometric distortion is a type of optical aberration that occurs as projection lenses deviate from rectilinear behavior. Geometric distortion occurs responsive to an image being projected from a projector onto a projection surface. During this projection, the rendered straight lines in the image or video do not appear as straight lines on the projection surface but instead appear as curves. To avoid geometric distortion, optical systems are optimized using discrete optical elements, but this optimization increases complexity, cost, and development time.

One solution to geometric distortion is electronic correction. In electronic correction, the optical geometric distortion caused by the projection system is characterized electronically with a parametric model (e.g., a polynomial equation), and electronic correction is then applied to cancel the distortion. For projection optics, however, parametric models can be inadequate, because either insufficient polynomial order exists or the distortion itself cannot be modeled by a regular polynomial model. Further, the distortion may be highly non-linear geometric distortion, which is difficult to recreate with a model.

In examples herein, optical distortion is modeled as a discrete pixel displacement with respect to an ideal image, rather than characterizing the optical distortion as a whole using a mathematical model. Specifically, examples of the technique described herein include a camera-assisted method and an algorithm for distortion characterization and correction. As described below, the camera-assisted method includes performing multi-pose structured light analysis to create a distortion map, and the distortion map is used to determine an inverse geometric transformation (e.g., a correction map). The inverse geometric transformation (correction map) is used to electronically warp the video signal that is provided to the projection system in a way that cancels the distortion caused by the projection optics and produces a rectilinear image.

Figure 1:
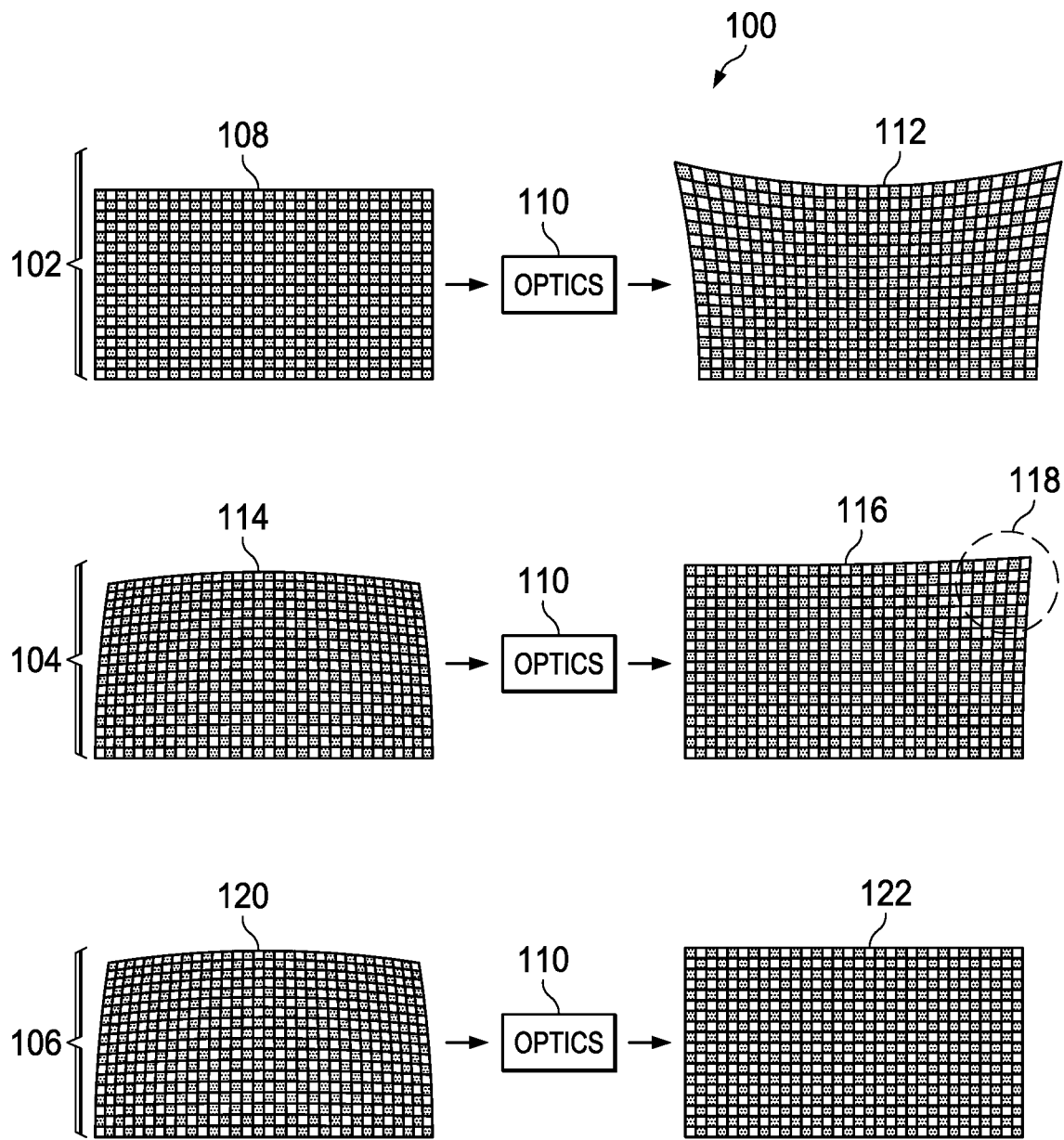
FIG. 1 is a schematic diagram of optical distortion and correction in accordance with various examples.

FIG. 1 is a schematic diagram of optical distortion and correction in accordance with various examples. FIG. 1 shows an example of optical distortion in a scenario 102, and two types of correction procedures in scenarios 104 and 106. In scenario 102, image 108 is a representation of a still image from a video signal that projection optics 110 projects onto a projection surface. In this example, image 108 is a black and white chessboard pattern, which exhibits rectilinear lines. The video signal is provided to projection optics 110, and projection optics 110 outputs image 112, which is the image 108 projected onto a projection surface for display. In image 112, the chessboard pattern of image 108 has undergone geometric distortion. Specifically, in image 112, the expected rectilinear lines are now curved, which is most noticeable along the top part of image 112. The projection optics 110 have distorted the image 108 relative to the input video signal. Scenario 102 shows the effect of optical distortion in the situation where no correction for distortion has been performed.

Scenario 104 is an example of electronic correction. Electronic correction often relies on a parametric model, such as a Brown-Conrady lens distortion model. In the Brown-Conrady model, lens distortion is classified into radial distortion and tangential distortion. The mathematical equations in the Brown-Conrady model use distortion coefficients that are obtained from the lens manufacturer or obtained through a calibration method.

A limitation of this type of parametric distortion model is residual distortion. Residual distortion refers to any geometric distortion that remains after correction. This distortion may be due to inaccuracies in the calibration process or to limitations imposed by the model itself, such as an insufficient polynomial order. It is also possible for some lenses to not conform to any distortion model, which means the lens cannot be characterized or corrected with a parametric model.

Scenario 104 shows how electronic correction is applied to an input image, such as image 108. The electronic correction has been applied to the rectilinear input image 108 and the result after electronic correction is applied is image 114. Image 114 is then provided to projection optics 110, with the goal of projection optics 110 projecting a rectilinear output image without distortion. Projection optics 110 receives image 114 as input and provides image 116 as output. The electronic correction applied to the image 114 has corrected a large portion of the distortion. However, the circled area 118 of image 116 still exhibits distortion. Area 118 represents residual distortion that can remain after electronic correction is performed in some systems.

Scenario 106 is an example of camera-assisted distortion correction according to examples described herein. Camera-assisted distortion correction has been applied to the rectilinear input image 108 according to the techniques described herein, and the result after this correction is image 120. Image 120 is then provided to projection optics 110. Responsive to projection optics 110 receiving image 120, the projection optics 110 provides image 122. Image 122 exhibits little to no distortion, including little to no residual distortion from the camera-assisted distortion correction.

Figure 2A:
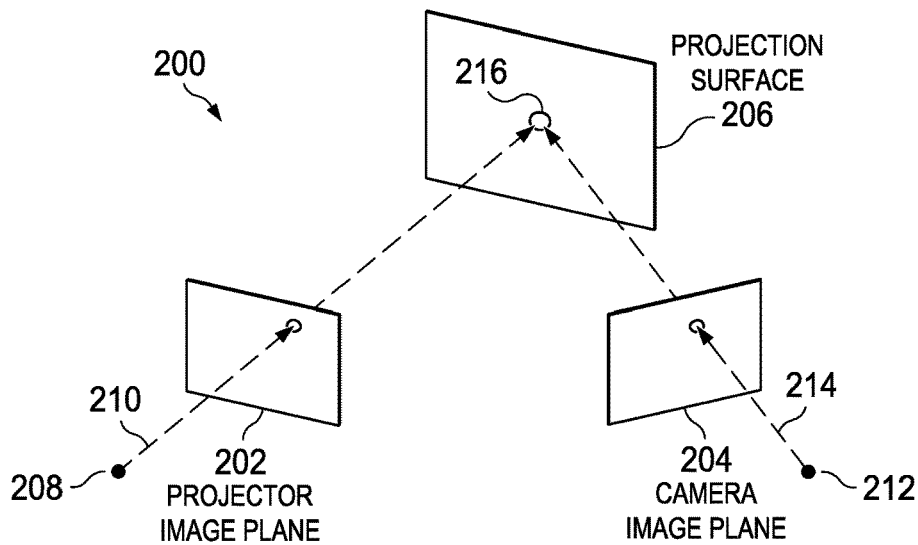
FIG. 2A is a schematic diagram of a system for production of projector optical rays for geometric distortion characterization in accordance with various examples.

FIG. 2A is an orthographic perspective view of a system 200 to produce projector optical rays for geometric distortion characterization, in accordance with various examples. In FIG. 2A, images are projected onto a surface and a camera records those images in order to produce a model of the geometric distortion. Geometric distortion is modeled as a pixel displacement from a reference expected position. System 200 includes a projector image plane 202 of a projector, a camera image plane 204 of a camera, and a projection surface 206. A projector (not expressly shown) including the projector image plane 202 is modeled as an inverse pinhole camera, represented by projector image plane 202 and projection center 208. According to the pinhole camera model, projected pixels are modeled as vectors in three-dimensional (3D) space, the orientation of which is determined by the two-dimensional (2D) pixel position of the projector image plane 202, the projection lens' focal length, and the principal axis of the projection lens. Responsive to geometric distortion being present, however, optical rays from the projector are displaced to a different position on projection surface 206 than the position that is expected by this model.

A projection center 208 is a point located at the origin (0, 0, 0) of a 3D Cartesian coordinate system. The projection center 208 is the origination point for the optical rays 210 that define the image. The optical rays 210 travel from projection center 208, pass through the projector image plane 202, pass through the projection surface 206 at point 216, and extend on to infinity.

The camera center 212 is a point located at a certain distance from projection center 208, within a camera (not expressly shown). Optical rays 214 originate at the camera center 212, pass through the camera image plane 204, pass through the projection surface 206 at point 216, and extend on to infinity.

As described below, a structured light pattern is projected by projection center 208 onto projection surface 206 via optical rays 210. Each one of the optical rays 210 from the projection center 208 intersects a corresponding (e.g., matched) optical ray 214 from the camera center 212 at a respective point 216 of the projection surface 206. The structured light pattern is captured by the digital camera corresponding to the camera center 212. This process is repeated for several different poses of projection surface 206. A pose is a combination of the position and the orientation of the projector and the digital camera with respect to the projection surface 206. The projector and digital camera are held in the same orientation with respect to one another. The digital camera captures the structured light pattern on projection surface 206 at a first pose, and then the projector and digital camera are moved to another pose (the projection surface 206 is not moved). At the next pose and each subsequent pose, another structured light pattern is captured by the digital camera. The discrete structured light patterns captured during the several different poses are used to establish a one-to-one correspondence between pixels in the projector image plane 202, pixels in the camera image plane 204, and pixels on the projection surface 206 by matching discrete elements in both the projector image plane 202 and camera image plane 204. The distortion caused by the projection lens can be determined from the several different poses as described below in FIG. 4.

Figure 2B:
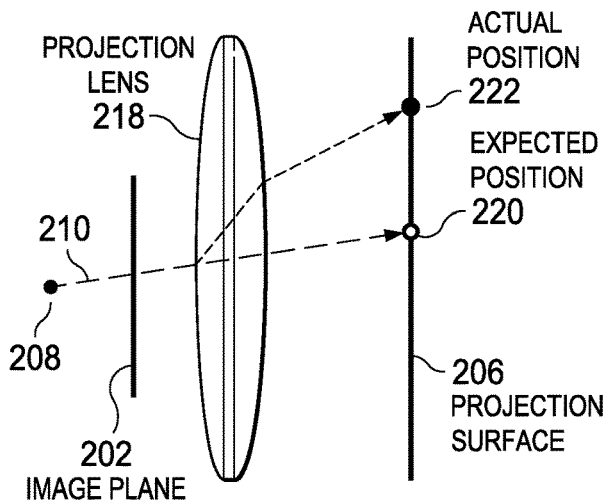
FIG. 2B is a schematic diagram of a projection lens in accordance with various examples.

FIG. 2B is a schematic diagram of a projection lens 218 according to various examples FIG. 2B is a side view of projector image plane 202 and projection surface 206 from FIG. 2A, with projection lens 218 inserted between projector image plane 202 and projection surface 206. FIG. 2B shows the distortion of one example optical ray caused by projection lens 218. In FIG. 2B, optical ray 210 is projected from projection center 208 through projector image plane 202. As optical ray 210 passes through projection lens 218, optical ray 210 experiences distortion. If projection lens 218 produced no distortion, optical ray 210 would strike projection surface 206 at point 220 (the expected position). Because of distortion caused by projection lens 218, optical ray 210 instead strikes projection surface 206 at point 222 (the actual position). Other optical rays from projection center 208 may also be distorted and strike projection surface 206 at positions others than their respective expected positions. FIG. 2B is one example of the type of geometric distortion that can be caused by a projection lens 218.

Figure 2C:
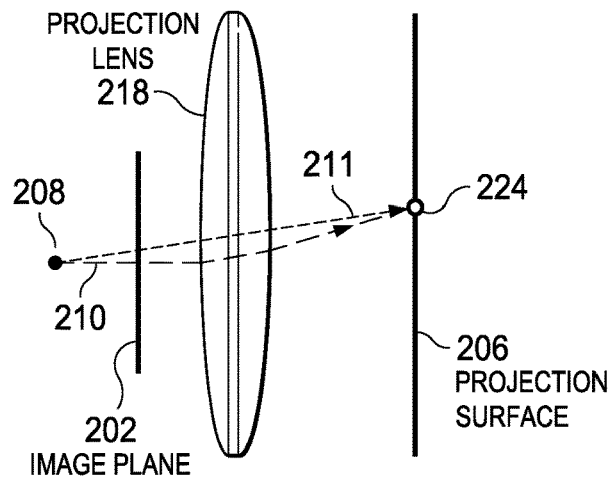
FIG. 2C is a schematic diagram of a projection lens in accordance with various examples.

FIG. 2C is a schematic diagram of a projection lens 218 according to various examples. FIG. 2C is also a side view of projector image plane 202 and projection surface 206 from FIG. 2A, with projection lens 218 inserted between projector image plane 202 and projection surface 206. FIG. 2C is an example of a projection lens 218 where camera-assisted correction has been performed. In FIG. 2C, optical ray 210 is projected from projection center 208 through projector image plane 202. Optical ray 210 has undergone a distortion correction according to an example herein, and therefore the optical ray 210 passes through projection lens 218 at an appropriate position that causes the optical ray to strike projection surface 206 at the expected position 224. With camera-assisted correction, the actual position where optical ray 210 strikes projection surface 206 is also the expected position (e.g., position 224). Therefore, no distortion of the image occurs with the projection lens 218 in FIG. 2C. Path 211 is the straight-line, expected path of the optical ray 210 in the scenario where no lens distortion is caused by projection lens 218.

Figure 3:
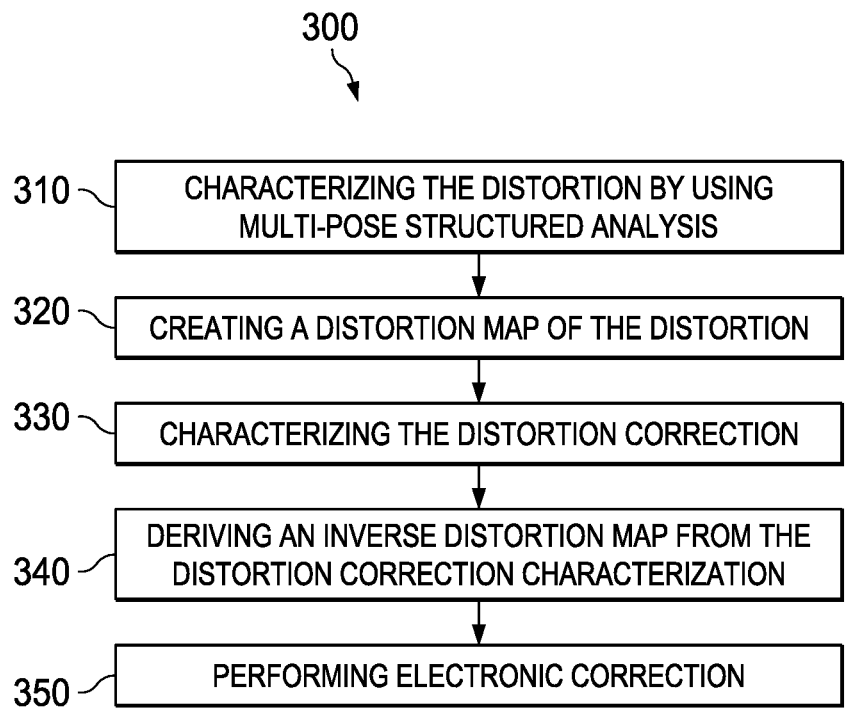
FIG. 3 is a flowchart of a method of camera-assisted projection optics in accordance with various examples.

FIG. 3 is a flowchart of a method 300 for camera-assisted projection optics distortion characterization and correction according to an example. The steps of method 300 may be performed in any suitable order. Method 300 is a simplified description of the methods described herein, and each step will be described in more detail in the figures and description below. The hardware and/or software that performs the steps of method 300 in one example is described in FIG. 16 below. Any appropriate hardware and/or software may be used in other examples.

Method 300 begins at step 310, where a processor or controller of a projector characterizes the distortion of the projection optics by using camera-assisted multi-pose structured analysis. This process is described below with respect to FIGS. 4-5. The projector can use an integrated camera in some examples, along with integrated processing hardware, to characterize the distortion of the projection optics. In another example, the camera may not be integrated in the projector.

Method 300 continues at step 320 where the processor or controller of the projector creates a distortion map. The distortion map is a numerical representation of the distortion. The distortion map represents the geometry transformation that operates on the rectilinear image plane (such as projector image plane 202). With the distortion characterized by the distortion map, the pixels projected from projection center 208 are displaced to a different location on the projection surface 206 than the expected location. This displacement creates a distorted image plane and produces a non-rectilinear image. The distortion map is described below with respect to FIGS. 6-9.

Method 300 continues at step 330 where the processor or controller of the projector characterizes the distortion correction. Characterizing the distortion correction is described below with respect to FIG. 10. The distortion correction is used to counter the distortion caused by the projection optics.

At step 340, the processor or controller of the projector derives the inverse of the distortion map from the distortion correction characterization. The inverse of the distortion map is called the correction map. The correction map operates on the input image or video and pre-displaces the optical rays prior to projection, in order to counter or reverse the distortion caused by the projection optics. An example correction map is described below with respect to FIGS. 11-13.

Method 300 continues at step 350, where the processor or controller of the projector performs electronic correction of the image. Electronic correction can include warping the image based on the correction map in one example. More than one correction map can be applied in some examples, in a process called convolution. Electronic correction is described below with respect to FIG. 14.

Figure 4:
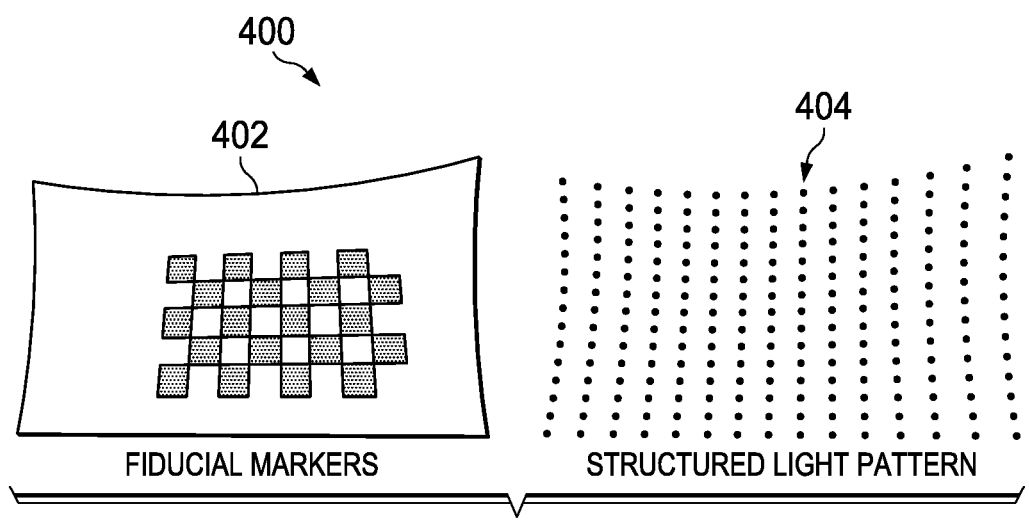
FIG. 4 is a schematic diagram of fiducial markers and a structured light pattern for distortion characterization in accordance with various examples.

FIG. 4 is a schematic diagram 400 of fiducial markers and a structured light pattern for distortion characterization according to an example. FIG. 4 illustrates an example of a component of step 310 as described above. Geometric distortion is modeled as a pixel displacement from a reference expected position. To determine geometric distortion, structured light pattern processing is performed. A planar surface (such as projection surface 206) is equipped with a set of fiducial markers with known geometry, such as the printed chessboard pattern 402. The fiducial markers provide a known pattern to help model the geometric distortion. A pattern with straight horizontal and vertical lines works well, such as the chessboard pattern. The chessboard pattern also uses horizontal and vertical lines that are evenly spaced, which is useful in some examples to model distortion. Any suitable pattern is useful in other examples. Then, a sequence of time-multiplexed structured light patterns 404 are projected onto projection surface 206 and captured with the digital camera for various poses, as described above with respect to FIG. 2A. By using a pattern with known geometry (such as the chessboard pattern 402) and a structured light pattern, a point-level representation of the projected pixels on the planar surface is determined. The structured light pattern can include any useful pattern in examples, such as light elements arranged in horizontal and vertical rows and evenly spaced apart. This process is repeated for several different poses of the planar surface, with respect to the projection system.

Discrete structured light patterns such as structured light pattern 404 are used to establish a one-to-one correspondence between pixels in the projector image plane 202, pixels in the camera image plane 204, and pixels on the projection surface 206 by matching discrete elements in both the projector image plane 202 and camera image plane 204. Structured light pattern 404 is composed of discrete structured light elements covering the entirety of the projected image. The number of time multiplexed patterns (N) used to establish pixel correspondence is determined by the number of vertical ($M_V$) and horizontal samples ($M_H$) as described in Equation 1:

$$N = \log_2(M_H) + \log_2(M_V) \quad (1)$$

For each pose of the projection surface 206, the 3D position of the projected structured light elements of structured light pattern 404 is calculated using the geometry information of the embedded fiducial markers of the printed chessboard pattern 402 and the intrinsic parameters of the calibrated camera. The relative rotation and translation of projection surface 206 with respect to the projector image plane 202 is determined using this point-and-pose algorithm. Each pose of the projection surface 206 creates a geometric map of displaced points. The collection of displaced points from the various poses provides a picture of the distortion caused by the projection lens 218. The average pixel displacement for each pixel, over all the poses, makes up the distortion map of the lens.

Figure 16:
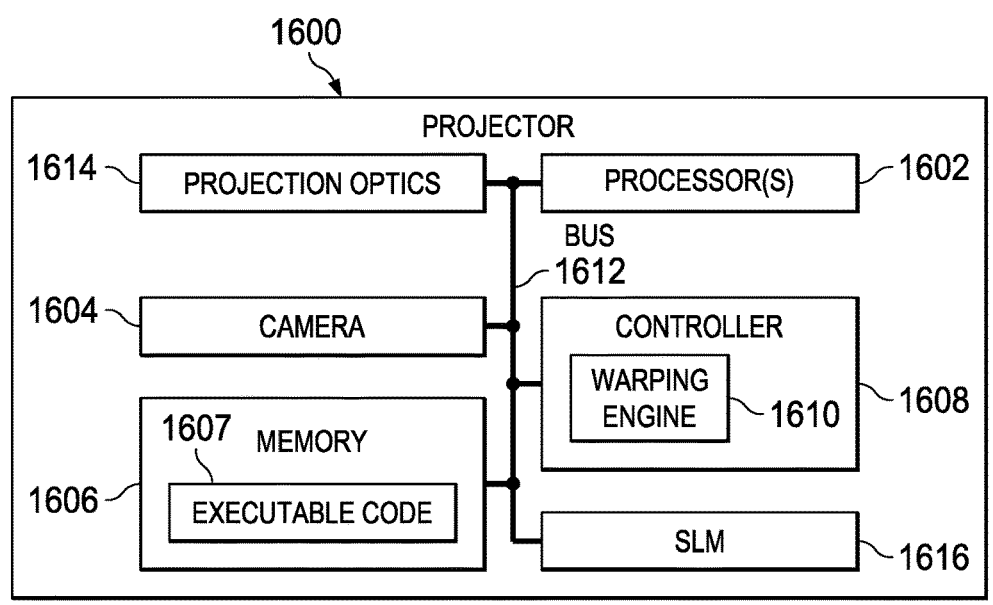
FIG. 16 is a schematic diagram of a projector in accordance with various examples.

In this manner, the distortion caused by the projection optics (such as projection lens 218 and other optical components) is characterized as a numerical transformation that is applied to each pixel in the video signal. While in some examples a single pose may be used to characterize the amount of geometric distortion, in one example approximately ten poses are used. To perform the poses, the camera is mechanically attached to the projector such that their orientations relative to one another are fixed. The factor that changes for each pose is the relative orientation of the projector to the projection surface 206. One structure for performing the poses is a projector with an integrated camera placed in front of the projection surface 206, and the projector/camera is moved with respect to projection surface 206 for each pose. FIG. 16 below shows one example of hardware that can perform the poses.

Figure 5:
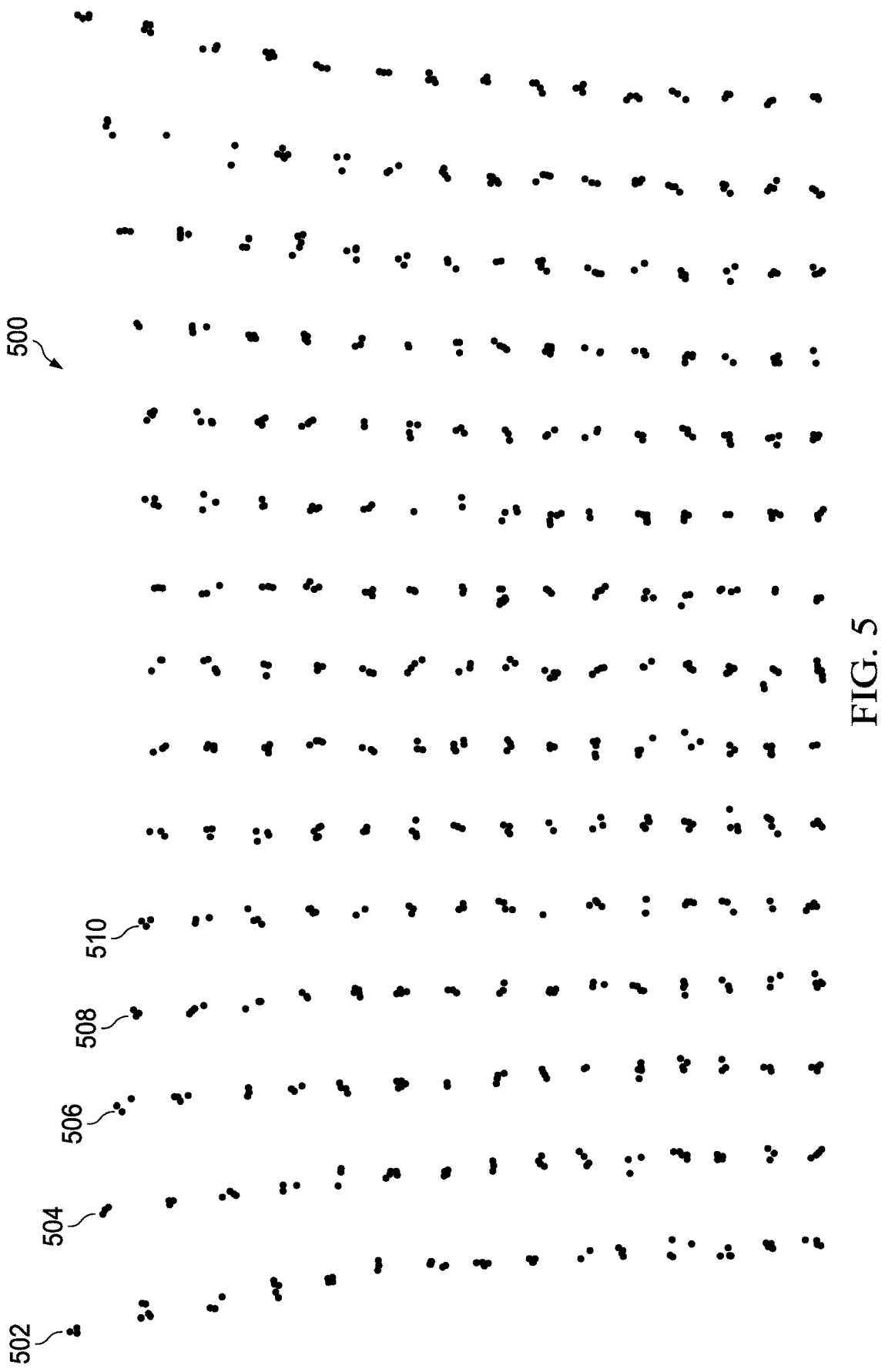
FIG. 5 is a point cloud for multiple poses created by a point-and-pose algorithm in accordance with various examples.

FIG. 5 is an example of a point cloud 500 for multiple poses created by a point-and-pose algorithm. FIG. 5 is an example of a component of step 310 as described above. The creation of point cloud 500 is the first step in characterizing the distortion. Multiple poses are performed using a geometric pattern with fiducial markers such as printed chessboard pattern 402 and the structured light pattern 404, as described above with respect to FIG. 4. For each pose, the dots in point cloud 500 represent the points of the structured light pattern 404. For example, the multiple poses result in multiple dots shown in FIG. 5 for point 502. The locations of these multiple dots for point 502 can be averaged to determine one location for point 502, described below in FIG. 6. In FIG. 5, the dots that result from the multiple poses of points 504, 506, 508, and 510 are also shown in point cloud 500.

Any technique is useful to determine the location for point 502 and other points based on the location of the multiple dots resulting from the multiple poses. For example, the positions of the multiple dots in (x,y) coordinate space can be averaged and point 502 located at the average position. A weighted average may be useful in some examples. A mean square error may be useful in other examples. Also, any number of poses is useful in various examples. A higher number of poses may result in a more accurate characterization of the distortion but at the cost of complexity, time, or processing power.

As seen in FIG. 5, distortion has caused the pixels to be displaced geometrically. In the absence of distortion, the dots in FIG. 5 would be in straight rows and columns. The printed chessboard pattern 402 is a rectilinear pattern, but the resulting point cloud 500 shows curved lines in the pattern caused by distortion, as evidenced by the location of points 502, 504, 506, 508, and 510.

Figure 6:
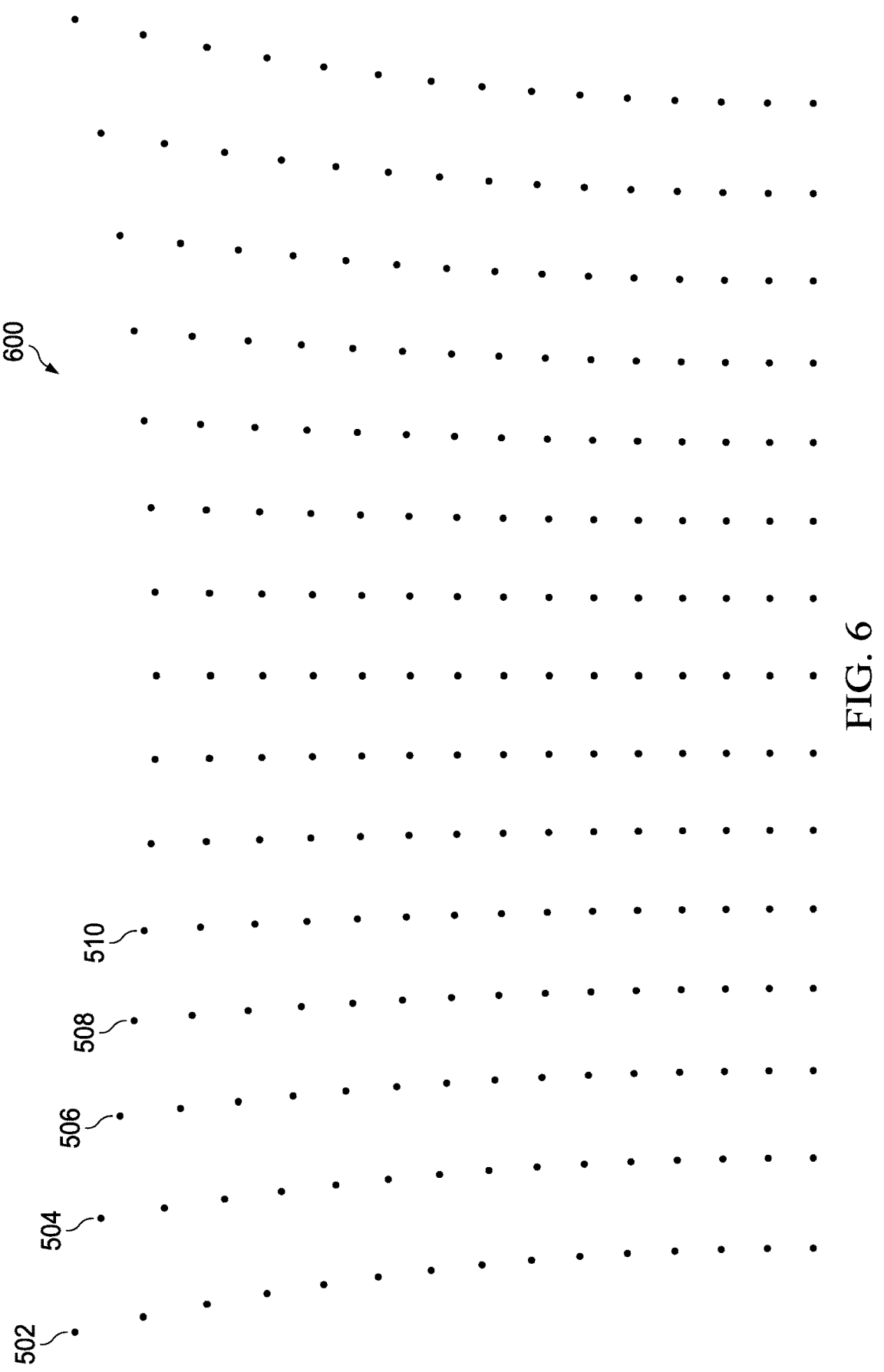
FIG. 6 is a point map of distortion created by a point-and-pose algorithm in accordance with various examples.

FIG. 6 is a point map 600 of distortion created by the point-and-pose algorithm. FIG. 6 is an example of a component of step 320 as described above. In point map 600, the dots for each point created by the various poses have been averaged or otherwise combined, and therefore each pixel is represented by a single point. Points 502, 504, 506, 508, and 510 represent the geometrically distorted position of pixels as determined by the point-and-pose algorithm. As a whole, point map 600 shows how the projection lens 218 and any other projection optics are distorting optical rays 210 as the optical rays 210 pass though the projection optics. In this example, pixels near the top corners of the image appear to be more geometrically displaced than points near the bottom center of the image. Other types of geometric distortion can be created by different projection optics.

Figure 7:
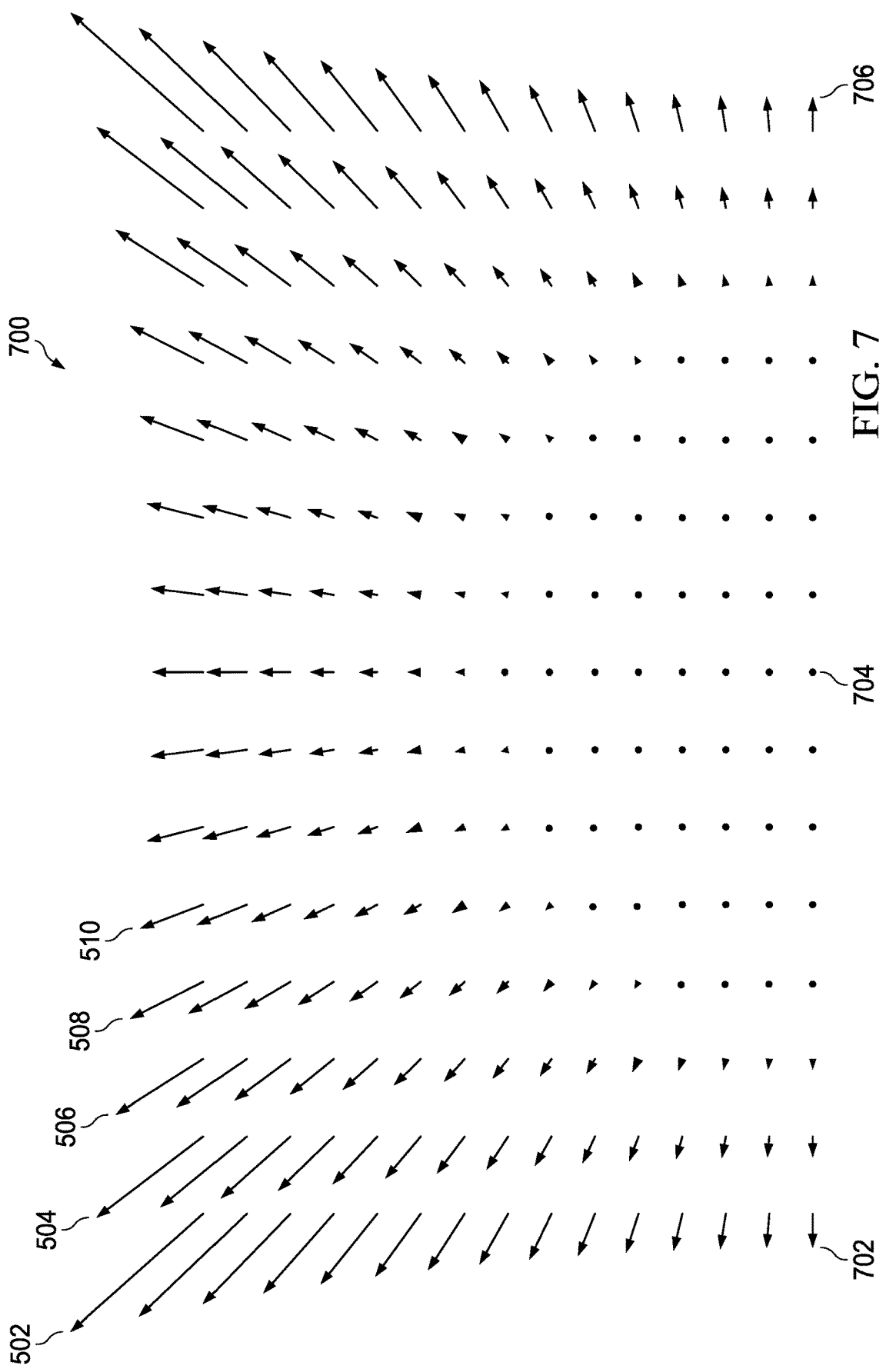
FIG. 7 is a point map of pixel displacement caused by distortion in accordance with various examples.

FIG. 7 is a point map 700 of pixel displacement caused by distortion according to an example. FIG. 7 is an example of a component of step 320 as described above. In point map 700, the geometric distance of pixel displacement is represented by arrows. For example, point 502 is shown at the head of an arrow in the top left portion of point map 700. Point 502 is the geometrically distorted position of the pixel as determined by the point-and-pose algorithm. The location of the tail of the arrow is the expected position of point 502 in the absence of distortion. Therefore, the orientation and length of the arrow corresponds to the magnitude and direction of the distortion for point 502 caused by the projection optics. Likewise, the arrows for points 504, 506, 508, and 510 show the magnitude and direction of the distortion for those points.

As another example, point 702 represents distortion that moves the original pixel geometrically to the left of the expected position of point 702. Point 704 shows that there is little if any geometric distortion at this point. Point 706 represents distortion that moves the point geometrically to the right of the expected position of point 706. Point map 700 provides a visual representation of the magnitude and direction of geometric distortion for each pixel in this example collection of pixels.

Figure 8:
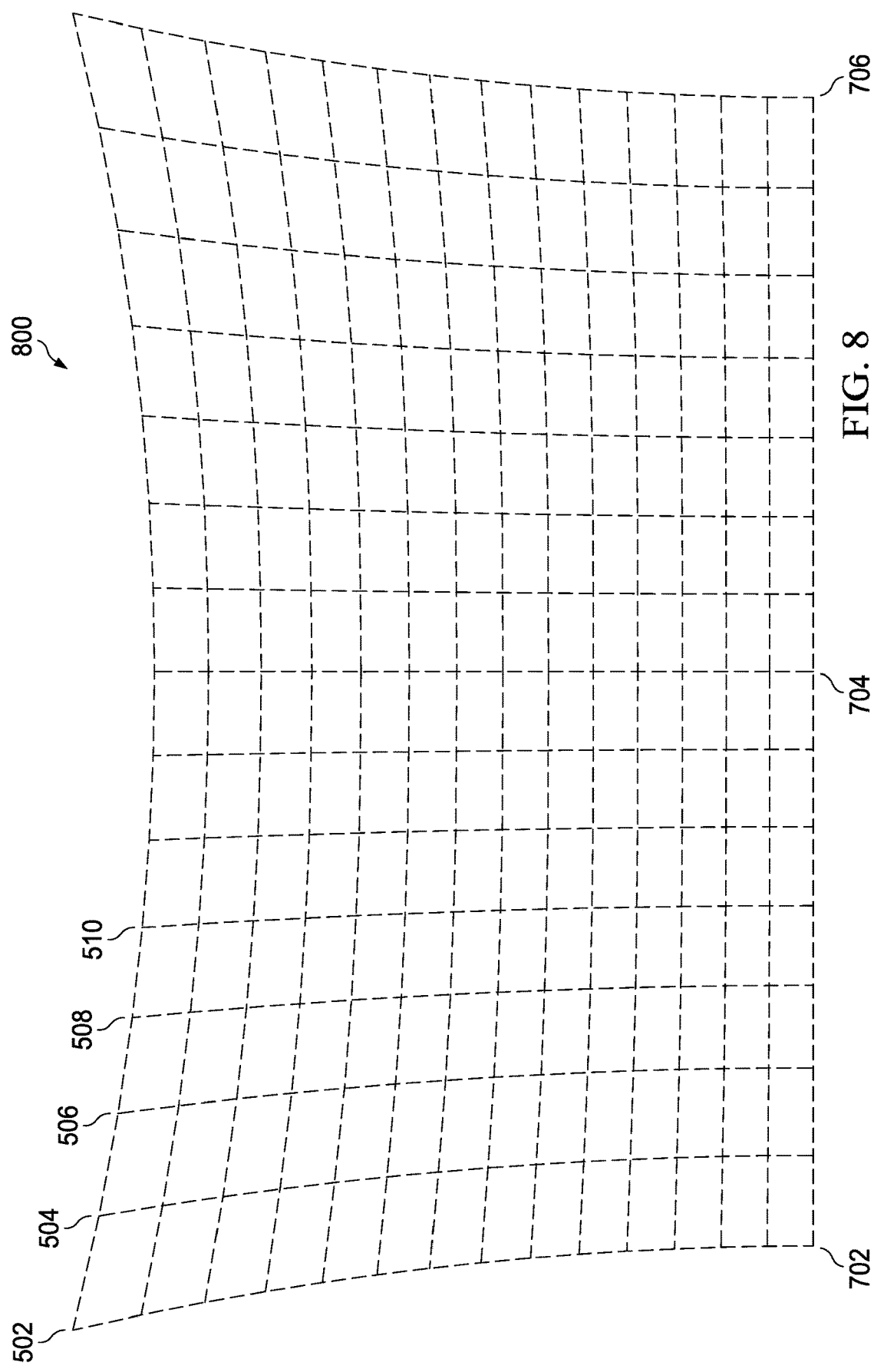
FIG. 8 is a distortion map in accordance with various examples.

FIG. 8 is a distortion map 800 according to an example. FIG. 8 is an example of a component of step 320 as described above. The distortion map 800 characterizes the geometric displacement of each pixel across the projector's field of view. The average pixel displacement over all the poses creates the distortion map of the projection lens 218. The distortion map 800 represents a geometry transformation operating on the rectilinear projector image plane 202 from an ideal pinhole inverse camera, which causes the projected pixels to be displaced to a different location in the image plane. This creates a distorted image plane and produces a non-rectilinear image, as seen in the distortion map 800.

Figure 9:
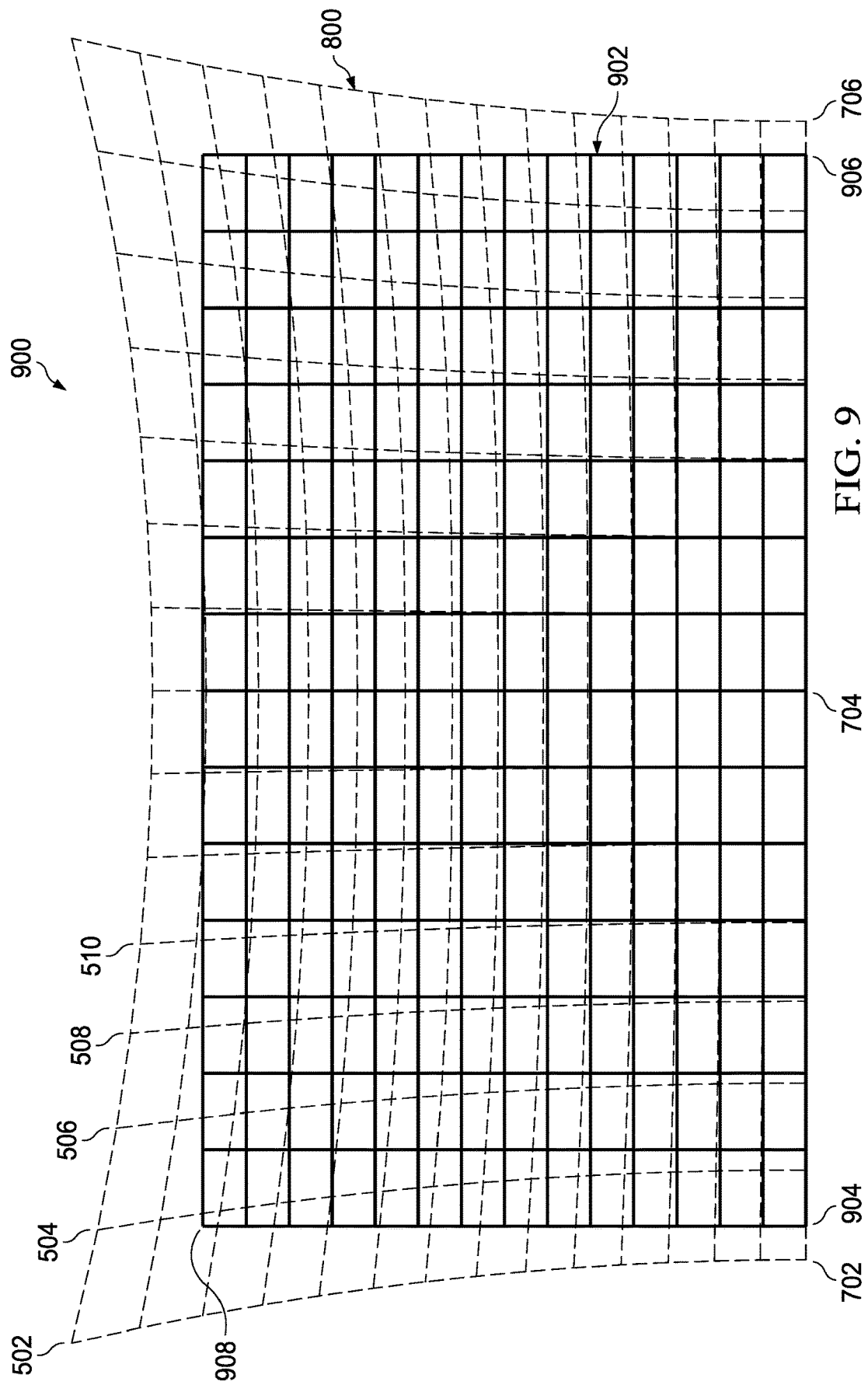
FIG. 9 is a schematic diagram of a distortion map and original sample points in accordance with various examples.

FIG. 9 is a schematic diagram 900 of the distortion map 800 and the original sample points 902. FIG. 9 is an example of a component of step 320 as described above. FIG. 9 provides a graphical representation of the original sample points 902 and the geometrically distorted location of those sample points after the image is subject to projection lens distortion, shown as the distortion map 800. For example, original sample point 904 undergoes projection lens distortion, and the distorted position for original sample point 904 corresponds to point 702 on the distortion map 800. Original sample point 906 undergoes projection lens distortion and the distorted position corresponds to point 706. Likewise, original sample point 908 corresponds to point 502 on distortion map 800. With distortion map 800, the projection optics are characterized as a numerical transformation applied to an input signal to a projector, represented by the original sample points 902. The input signal can be an image or video signal in various examples.

Because the geometry transformation that predicts lens distortion exists (as characterized by distortion map 800), there is an inverse geometry transformation that corrects or cancels out such distortion. By applying the inverse geometry transformation to the input video signal (characterized by original sample points 902), pixels in the projector image plane 202 will displace to different positions, changing the orientation of the optical rays and producing a rectilinear image on projection surface 206. This inverse geometry transformation is called the correction map. With the correction map, the optical rays from projection center 208 are pre-displaced prior to projection, with the result that the optical rays strike the projection surface 206 at the expected location. FIG. 2C is an example of how pre-displacing optical rays prior to passing the rays through a lens can cancel out the distortion caused by the lens.

Figure 10:
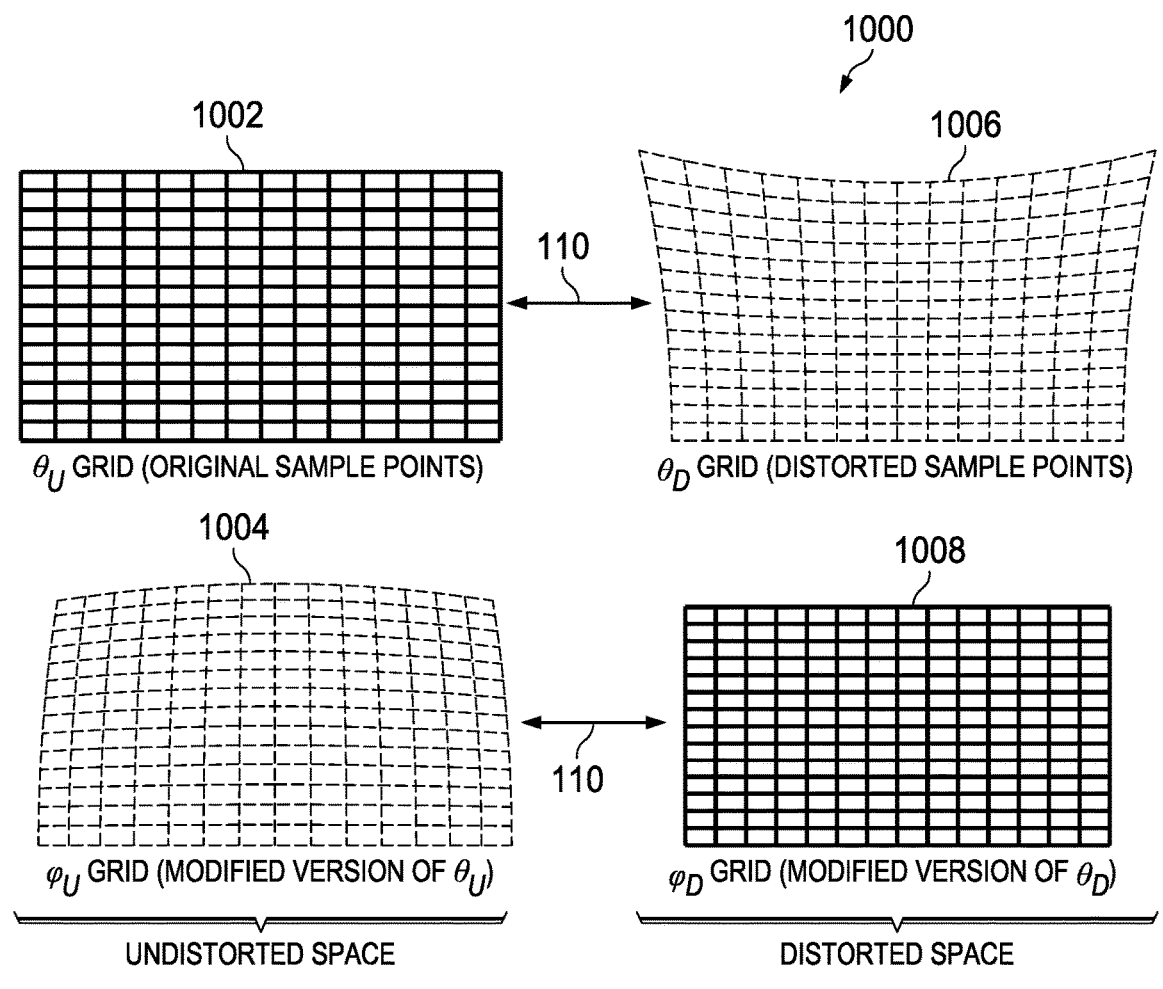
FIG. 10 is a schematic diagram of undistorted image space and distorted image space in accordance with various examples.

FIG. 10 is a schematic diagram 1000 of undistorted image space and distorted image space according to an example. FIG. 10 is an example of a component of step 330 as described above. Based on the geometry transformations that define the distortion and correction maps, two image spaces can be created: the undistorted image space and the distorted image space. The plane 1002 is a grid $\theta_U$ of the original sample points in undistorted space. The plane 1004 is a grid $\varphi_U$ in undistorted space containing a modified version of the points in plane 1002. The points in plane 1004 have been modified by applying a correction map to the points in plane 1002.

Plane 1006 is a grid $\theta_D$ of distorted sample points in distorted space. The black arrows in FIG. 10 represent the projection optics 110. As the original sample points in plane 1002 pass through projection optics 110, the result produced by projection optics 110 is plane 1006. The sample points in plane 1002 have been distorted according to the distortion characteristics of projection optics 110. Plane 1008 is a grid $\varphi_D$ in distorted space containing a modified version of the points in plane 1006. As the sample points in plane 1004 pass through projection optics 110, the result produced by projection optics 110 is plane 1008. Plane 1004 represents sample points that have been modified by the correction map, and so after passing through projection optics 110 these sample points produce a rectilinear, undistorted image represented by plane 1008.

Figure 11:
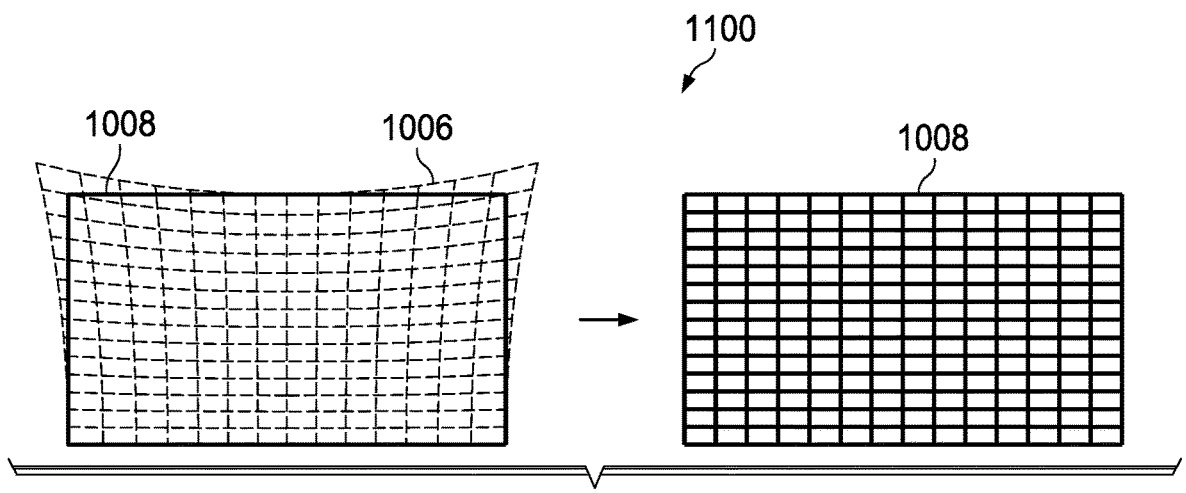
FIG. 11 is a schematic diagram of planes in distorted space in accordance with various examples.

FIG. 11 is a schematic diagram 1100 of planes 1006 and 1008 in distorted space. FIG. 11 is an example of a component of step 340 as described above. Plane 1006 is the grid $\theta_D$ of distorted sample points in distorted space. The correction map is constructed by re-arranging the points in plane 1006 ($\theta_D$) to form an orthogonal grid with the projector's aspect ratio or interior box. Because most types of correction reduce the size of the projected image and, consequently, its brightness, the size and placement of the interior box is optimized to be the largest possible rectangular area inside plane 1006 ($\theta_D$). This orthogonal grid is $\varphi_D$, or plane 1008. As described in FIG. 10, plane 1008 is a modified version of plane 1006, both in distorted space. As described below, the correction map is determined by mapping points from plane 1008 to plane 1004, using planes 1002 and 1006 as reference grids.

Because the orthogonal grid (plane 1008) is defined in the distorted space, specifically in $\varphi_D$ (plane 1008), the next step is finding an equivalent grid in the undistorted space (e.g., plane 1004, or grid $\varphi_U$). This is accomplished by use of a grid mapping algorithm: points in between samples in the $\theta_D$ grid (plane 1006) can be mapped to the grid in $\theta_U$ (plane 1002), via a local homography transformation. A homography transformation is a transformation between two planes. For each point in the $\varphi_D$ grid (plane 1008), the enclosing four sample points from the $\theta_D$ grid (plane 1006) are identified, and a homography matrix relating both planes is calculated. This transformation is local to the quadrilaterals created by the four sample points, and therefore each pair of quadrilaterals will have its own unique perspective transform, for a total of $(M_H-1)*(M_V-1)$ transformation matrices, where $M_H$ is the number of horizontal samples and $M_V$ is the number of vertical samples. Equation 2 defines the mapping of points between the $\theta_D$ and $\theta_U$ planes (planes 1006 and 1002, respectively).

$$\vec{p}_U = H * \vec{p}_D \quad (2)$$

H represents a 3×3 matrix encoding the local perspective transform, and $\vec{p}_U$ and $\vec{p}_D$ represent the 2D points from the $\varphi_U$ (plane 1004) and $\varphi_D$ (plane 1008) planes in homogeneous coordinates. The 2D points ($\vec{p}_D$) from plane 1008 and the matrix H are used to find the 2D points ($\vec{p}_U$) in plane 1004. After the matrix is applied to every point in plane 1008, the result is plane 1004 (which represents the correction map).

Figure 12:
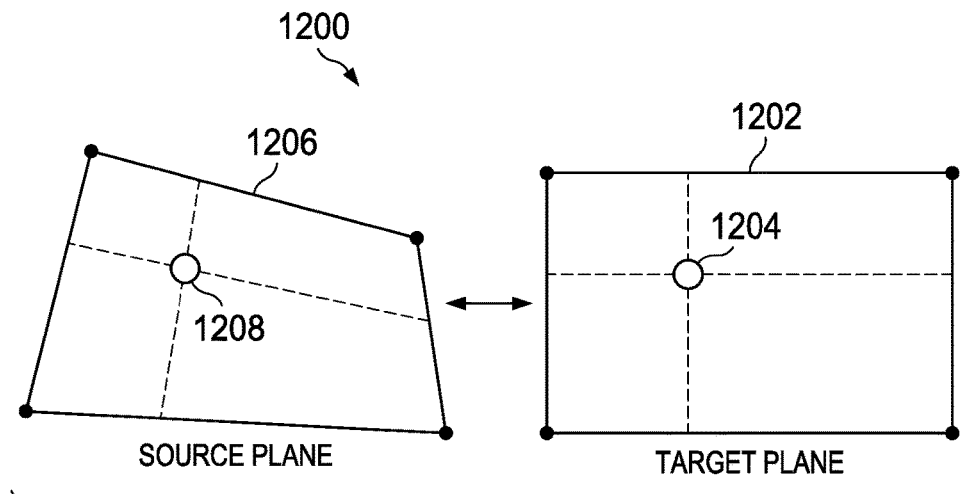
FIG. 12 is a schematic diagram of a homography transformation in accordance with various examples.

FIG. 12 is a schematic diagram 1200 of a homography transformation in an example. FIG. 12 is an example of a component of step 340 as described above. A target plane 1202 includes a point 1204, which is a point in the $\varphi_D$ grid (plane 1008). For each point such as point 1204 in plane 1008, a point from the $\theta_D$ grid (plane 1006) is identified. Source plane 1206 and point 1208 are from the $\theta_D$ grid (plane 1006), which is the grid of distorted sample points. After all points are mapped, a new grid is formed. The new grid is plane 1004, which is defined in the undistorted space and represents the correction map.

Figure 13:
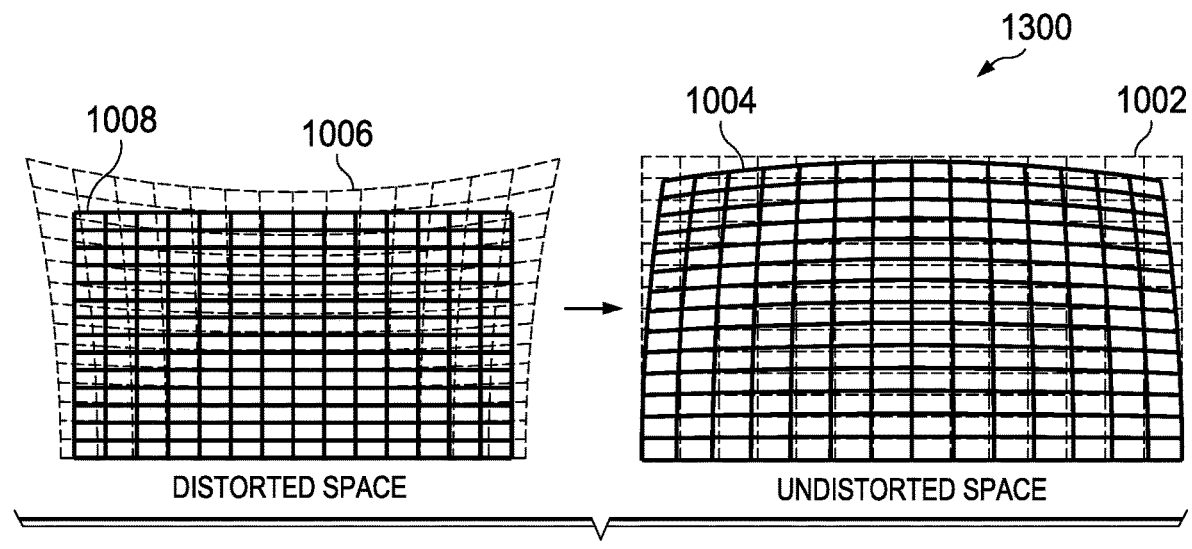
FIG. 13 is a schematic diagram of distorted image spaces and undistorted image spaces in accordance with various examples.

FIG. 13 is a schematic diagram 1300 of the distorted image space and undistorted image space according to an example. FIG. 13 is an example of a component of step 340 as described above. On the left, plane 1006 of distorted sample points is shown on top of plane 1008, which is a modified version of plane 1006 in distorted space. On the right, plane 1002 of sample points is shown on top of plane 1004, which is the correction map for the projection optics 110 in undistorted space. As described above, the correction map was determined by mapping points from plane 1008 to plane 1004 using planes 1002 and 1006 as reference grids.

Both the distortion map (plane 1006) and correction map (plane 1004) operate in the rectilinear projector image plane 202 and complement the pin-hole camera model representing the projector. The distortion map encodes the displacement profile of the pixels, which accounts for the geometric distortion induced by the projection lens 218. The correction map contains the pixel displacement profile used to cancel out the distortion characterized by the distortion map. That is, the distortion map indicates how each pixel in the image is distorted geometrically by the projection optics. The correction map indicates how each pixel in the image should be pre-distorted geometrically before passing through the projection optics, in order to cancel out the distortion that will be caused when the pixels pass through the projection optics.

While distortion characterization is performed with the use of a digital camera, geometric distortion correction is performed with the use of an electronic warping engine which applies the correction map to the input video signal. Warping transformations are encoded in a structure called the warping map, which contains the pixel displacement information to warp an input video signal prior to projection. As the appropriate distortion correction warping map is applied to a projector with lens distortion, the warping map generates the inversely transformed image that cancels out distortion.

The distortion correction warping map is static in the sense that it is tied to the projection lens 218. This means that the warping map operates on top of any other existing transient warping correction. Transient warping correction refers to user-initiated corrections arising from interactions between the projection system and the physical environment in which the projection system resides. One example is keystone distortion, which occurs responsive to the projection system not being perpendicular to the projection surface 206. This causes the projected image to be deformed into a trapezoid. Correcting for keystone distortion involves warping the input video signal into an irregular quadrilateral that, as the video signal is projected, produces a rectilinear image. Therefore, correcting for both static distortion (e.g., projection optics distortion) and transient transformations (e.g., keystone distortion) involves the convolution of the two or more warping maps, with each warping map describing one or more of the multiple transformations.

Figure 14:
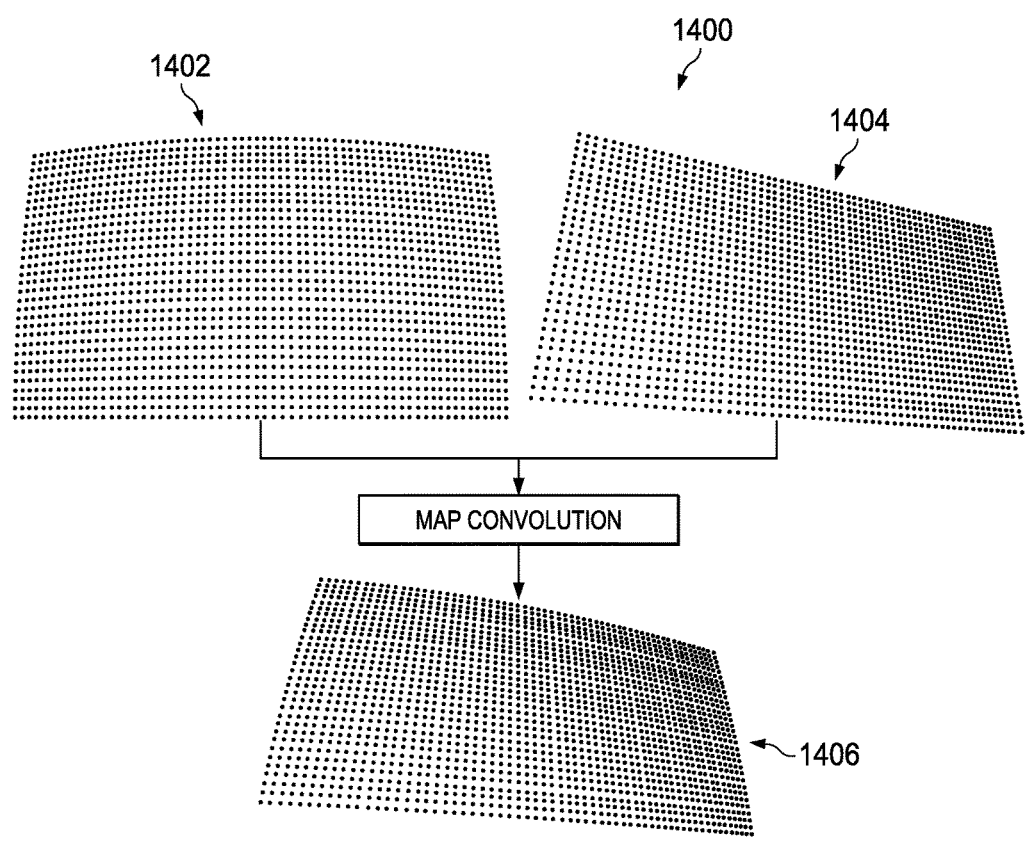
FIG. 14 is a schematic diagram of map convolution in accordance with various examples.

FIG. 14 is an example of map convolution. FIG. 11 is an example of a component of step 350 as described above. Convolution refers to the process of superimposing two linearly independent geometry transformations to generate a third geometry transformation, where the third geometry transformation is representative of the first two transformations. The distortion correction transformation, as described herein, operates on top of any existing transient warping transformation. As the distortion correction transformation is applied, it will displace each one of the transient warping map elements to a different location in the projector image plane. In one example, map convolution is done using a modified version of the grid mapping algorithm described above with respect to FIG. 12. Both maps are represented as non-orthogonal grids, defined with respect to a common orthogonal grid (the projector image plane 202). For every point in the transient map grid, the enclosing four sample points from the orthogonal grid are identified. Then, the local homography between the enclosing quadrant in the orthogonal grid and its corresponding quadrant in the distortion map grid is calculated. Finally, the point is mapped using a perspective transformation. FIG. 14 contains an example system 1400 of a warping map convolution. In system 1400, a distortion correction map 1402 is convolved with a keystone correction map 1404, resulting in a convolution correction map 1406 that is representative of both correction maps (1402 and 1404). In an example, the distortion correction map 1402 is created using the processes described above in one example. The distortion correction map 1402 helps to correct for the distortion caused by the optical system. In an example, the keystone correction map 1404 helps to correct for the projection system not being perpendicular to the projection surface, as described above. The two correction maps (1402 and 1404) are convolved and convolution correction map 1406 is the result. Convolution correction map 1406 can be applied to the input video signal to help to correct distortion. More than two maps can be convolved in other examples. The hardware described below with respect to FIG. 16 can perform map convolution.

Figure 15:
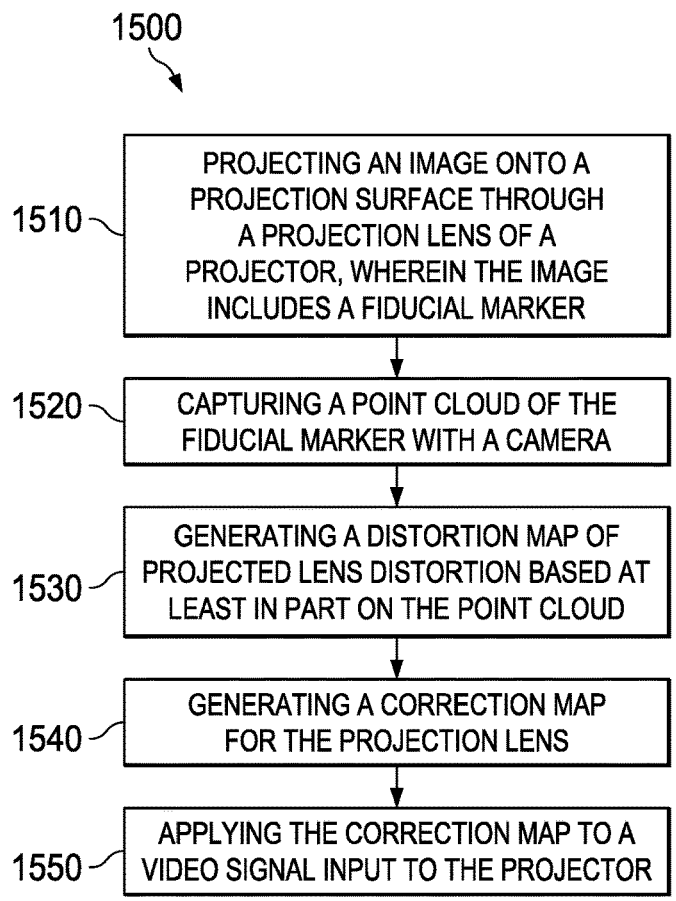
FIG. 15 is a flowchart of a method for camera-assisted distortion characterization and correction in accordance with various examples.

FIG. 15 is a flowchart of a method 1500 for camera-assisted distortion characterization and correction. The steps of method 1500 may be performed in any suitable order. The hardware components described below with respect to FIG. 16 can perform the method steps of FIG. 15 in one example.

Method 1500 begins at step 1510, which recites projecting an image onto a projection surface through a projection lens of a projector, wherein the image comprises a fiducial marker. A projector performs this step in one example. As described above with respect to FIGS. 2A and 4, the fiducial marker may include a known geometry, such as a chessboard pattern. The known geometry is useful to determine the distortion map in the steps described below.

Method 1500 continues at step 1520, which recites capturing a point cloud of the fiducial marker with a camera. A point cloud is described above with respect to FIG. 5. The point cloud can be captured for one or more poses. To perform the one or more poses, the camera is mechanically attached to the projector such that their orientation to one another is fixed. The camera captures the point cloud for each pose. The projector and camera are then moved with respect to projection surface 206 for each pose.

Method 1500 continues at step 1530, which recites generating a distortion map of projection lens distortion based at least in part on the point cloud. Any suitable processor or controller can generate the distortion map. Distortion map 800 in FIG. 8 is one example of a distortion map that characterizes distortion caused by a projection lens or other projection optics.

Method 1500 continues at step 1540, which recites generating a correction map for the projection lens. The correction map is usable to cancel at least a portion of the distortion caused by the projection lens. Plane 1004 in FIG. 10 is one example of a correction map that cancels distortion, such as the distortion characterized by the distortion map of plane 1006. Any suitable processor or controller can generate the correction map.

Method 1500 continues at step 1550, which recites applying the correction map to a video signal input to the projector. Applying the correction map to the video signal input to the projector operates to pre-displace the optical rays from the projector prior to passing the rays through a lens, which acts to cancel out the distortion caused by the lens. Any suitable processor or controller can apply the correction map to the input signal.

FIG. 16 is a schematic diagram of a projector 1600 in accordance with examples. Projector 1600 includes a processor 1602, a camera 1604 (e.g., mechanically attached to or integrated into the projector 1600 such that their orientations relative to each other are fixed), a memory 1606 (e.g., random access memory, read-only memory), a controller 1608, projection optics 1614, a spatial light modulator (SLM) 1616, and/or a bus 1612. The memory 1606 includes executable code 1607. The controller 1608 may include a warping engine 1610, which includes executable code. The executable code 1607, when executed by a processor 1602 or the controller 1608, causes the processor 1602 or the controller 1608 to perform one or more of the actions described herein and attributed to the projector 1600. The warping engine 1610, when executed by the controller 1608, causes the controller 1608 to perform one or more of the actions described herein and attributed to the projector 1600. In some examples, processor 1602 may perform the actions of warping engine 1610 instead of controller 1608. Among other actions, the processor 1602 and/or the controller 1608 may control and/or interact with the camera 1604 and/or the projection optics 1614. Processor 1602 may include multiple processor in an example. Spatial light modulator 1616 modulates a beam of light in some examples, and can be any type of spatial light modulator in an example. Bus 1612 connects the components in projector 1600 and allows for communication between the components.

The camera 1604 is configured to capture an image of a fiducial marker for one or more poses of a projection surface, as described above with reference to FIG. 4. The processor 1602 and/or controller 1608 are configured to generate a structured light pattern and a point cloud of the fiducial marker. The structured light pattern is also projected through projection optics 1614. The processor 1602 and/or controller 1608 are also configured to generate a distortion map of distortion caused by the projection optics 1614 based at least in part on the point cloud, as described above with reference to FIGS. 6-10. The processor 1602 and/or the controller 1608 generate a correction map for the projection optics 1614, where the correction map cancels at least a portion of the distortion caused by the projection optics 1614, as described above with reference to FIGS. 11-13. The processor 1602 and/or the controller 1608 apply the correction map to an input signal to the projection optics 1614, as described above with reference to FIG. 14. The warping engine 1610, when executed by the controller 1608 or processor 1602, can apply warping maps to images and video signals as described above with reference to FIG. 14.

In one example, warping engine 1610 causes the controller 1608 or the processor 1602 to apply a correction map to an input signal provided to the projection optics 1614. Warping engine 1610 can also perform map convolution as described above with respect to FIG. 14, and apply a convolved correction map to an input signal provided to the projection optics 1614, which can be a video signal in an example. The processor 1602 and/or controller 1608 are also configured to perform map convolution in some examples.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include the replaced components to provide functionality at least partially similar to functionality available prior to the component replacement.

Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
   projecting a first structured light pattern by a projection lens of a projector while the projector and a camera are in a first pose;
   capturing, by the camera, a first image of the first projected structured light pattern;
   producing, by at least one processor, a first point-level representation of projected pixels based on the first image;
   projecting a second structured light pattern by the projection lens while the projector and the camera are in a second pose;
   capturing, by the camera, a second image of the second projected structure light pattern;
   producing, by the at least one processor, a second point-level representation of the projected pixels based on the second image;
   generating a distortion map of projection lens distortion based on the first image and the second image; and
   generating a correction map based on the distortion map.

2. The method of claim 1, wherein generating the correction map is performed using a homography transformation.

3. The method of claim 2, further comprising:
   applying the correction map to a projection image to produce a corrected image; and
   projecting the corrected image.

4. The method of claim 1, further comprising:
   convolving a transient warping transformation and the correction map to create a convolution correction ma;
   applying the correction map to a projection image to produce a corrected image; and
   projecting the corrected image.

5. The method of claim 1, wherein the correction map is an inverse geometric transformation of the distortion map.

6. The method of claim 1, further comprising cancelling at least a portion of distortion caused by the projection lens using a pixel displacement profile of the correction map.

7. The method of claim 1, wherein the distortion map characterizes distortion as a pixel displacement with respect to the first image and the second image.

8. The method of claim 1, wherein the first structured light pattern comprises discrete structured light elements covering the first image.

9. The method of claim 1, wherein the projector and the camera are mechanically attached to one another, their orientations relative to one another being fixed.

10. A system, comprising:
    a projector comprising projection optics; and
    a controller coupled to the projector, the controller configured to:
    obtain a point cloud of a fiducial marker;
    generate a distortion map of distortion based at on the point cloud;
    generate a correction map for the projection optics;
    generate a transient warping map for the system;
    convolve the correction map with the transient warping map to produce a convolution correction map;
    apply the convolution correction map to a projection image to produce a corrected image; and
    instruct the projector to project the corrected image, wherein the projector is configured to project the corrected image.

11. The system of claim 10, wherein the correction map includes a pixel displacement profile that is configured to cancel distortion caused by the projection optics.

12. The system of claim 10, wherein obtaining the point cloud includes projecting a structured light pattern onto a projection surface.

13. The system of claim 10, wherein the projection optics and a camera are mechanically attached to one another, their orientations relative to one another being fixed.

14. The system of claim 10, wherein the controller is further configured to generate the correction map using a homography transformation.

15. The system of claim 10, wherein the correction map is an inverse geometric transformation of the distortion map.

16. The projector of claim 10, the projector further configured to project the corrected image.

17. A system, comprising:
    a projector comprising projection optics, the projector configured to:
    project a first structured light pattern while the projector and a camera are in a first pose; and
    project a second structured light pattern while the projector and the camera are in a second pose;
    the camera configured to:
    capture a first image of the first projected structured light pattern while the projector and the camera are in the first pose; and
    capture a second image of the second projected structured light pattern while the projector and the camera are in the second pose; and a controller coupled to the projector and to the camera, the controller configured to:
  produce a first point-level representation of projected pixels based on the first image of the first structured light pattern;
  produce a second point-level representation of projected pixels based on the second image of the second structured light pattern;
  generate a distortion map based on the first point-level representation and the second point-level representation; and
  generate a correction map based on the distortion map.

18. The system of claim 17, wherein the controller is further configured to generate the correction map using a homography transformation.

19. The system of claim 17, wherein the correction map is an inverse geometric transformation of the distortion map.

20. The system of claim 17, the controller further configured to produce a corrected image based on the correction map, and the projector further configured to project the corrected image.

* * * * *